United States Patent
Ash et al.

(10) Patent No.: US 6,496,480 B1
(45) Date of Patent: Dec. 17, 2002

(54) SUCCESS-TO-THE-TOP CLASS OF SERVICE ROUTING

(75) Inventors: Gerald Richard Ash, West Long Branch, NJ (US); Jiayu Chen, Morganville, NJ (US); Saul Daniel Fishman, Edison, NJ (US); Anurag S. Maunder, Scotch Plains, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/271,473

(22) Filed: Mar. 17, 1999

(51) Int. Cl.[7] .................................................. H04J 3/14
(52) U.S. Cl. ..................... 370/238.1; 370/397; 370/399
(58) Field of Search ................................. 370/230, 235, 370/238, 238.1, 391, 392, 395.1, 395.2, 395.21, 395.3, 396, 397, 400, 409, 399

(56) References Cited

U.S. PATENT DOCUMENTS

| | | | |
|---|---|---|---|
| 5,130,982 A | 7/1992 | Ash et al. | 370/85.7 |
| 5,392,344 A | 2/1995 | Ash et al. | 379/221 |
| 5,544,161 A * | 8/1996 | Bigham et al. | 370/397 |
| 5,559,877 A | 9/1996 | Ash et al. | 379/221 |
| 5,649,108 A * | 7/1997 | Spiegel et al. | 709/241 |
| 6,304,546 B1 * | 10/2001 | Natarajan et al. | 370/409 |

OTHER PUBLICATIONS

"Routing Algorithms in ATM Networks" by T.P.Jordan and M.J.Morse, Copyright 1994, The Institution of Electrical Engineers.*

* cited by examiner

Primary Examiner—Salvatore Cangialosi

(57) ABSTRACT

An originating switch (110) in a packet-based telecommunications network (100) routes calls to a terminating switch using the combination of Success-to-the Top (STT) and Class-of-Service criterion. In routing a call to the terminating switch, the originating switch 110 checks for available bandwidth for the class of service of the call on the direct path (116) between switches. If the path has available bandwidth, the originating switch routes on the direct path. Otherwise, the originating switch searches for the most recently successful one of a plurality the via switches ($118_1$–$118_n$) linking the originating and terminating switches to determine whether that via switch can successfully route the call to the terminating switch. If the most recently successful one of the via switches possesses available bandwidth to route the call in accordance with its class of service, the originating switch 110 selects that via switch to route the call. Otherwise, if the most-recently successful via switch can not route the call, the originating switch 110 searches for a next successful via switch. If none of the via switches $118_1$–$118_n$ can successfully route the call in accordance with its class of service, the originating switch will either attempt a route advance or crankback the call.

12 Claims, 2 Drawing Sheets

SUCCESS-TO-THE-TOP CLASS OF SERVICE ROUTING

TECHNICAL FIELD

This invention relates to a technique for routing telephone calls in a packet-based network.

BACKGROUND ART

Traditional telecommunications networks typically use dedicated circuits to carry telephone traffic between facilities. Within such traditional networks, switching systems, such as the 4ESS switching systems used by AT&T, route calls by setting up a circuit that lasts the entire duration of the call and then tearing down the circuit thereafter. For this reason, such traditional networks are commonly referred to as "circuit-switched" networks. Increases in traffic and capacity constraints on existing switches within such circuit-switched networks has prompted the development of packet-based networks utilizing Asynchronous Transport Mode (ATM) switches at their core. Within such packetized networks, core ATM switches route packetized calls to and from switches at the edge of the network that exchange traffic with sources such as local exchange carriers, international carriers and direct nodal subscribers. Unlike conventional circuit switches, ATM switches afford the advantage of allocating resources (e.g., time slots) only at packet transfer, rather than for the entire duration of a call. Moreover, packet-based networks can more easily make use of a relatively small number of high bandwidth paths, as compared to the larger number of circuits needed to make connections between switches in conventional circuit-switched networks.

Traditional switches in circuit-switched networks employ one or more of several well-known techniques for routing calls. One such technique is "Success to the Top" (STT) routing whereby an originating switch initially attempts to route a call to a terminating switch over a direct link (if it exists) between the switches. When a direct link is unavailable, the originating switch looks for a link through an intermediate (via) switch. The originating switch initially selects the via switch that most recently carried a call successfully between the originating and terminating switches. The originating switch selects the most recently successful via switch on the premise that such a via switch, once previously successful, can successfully route a subsequent call in the same manner as before.

If the most recently successful via switch is incapable of routing the call, then that via switch indicates its unavailability by sending a message, often referred to as a release or crankback message, to the originating switch. Thereafter, the originating switch searches for a next successful via switch. If the originating switch receives a crankback message from a via switch in this search, the originating switch continues its hunt for a next successful via switch. As may be appreciated, the Success to the Top (STT) routing method gets its name from the use made by the originating switch of the most recently successful via switch.

While the STT routing method is applied within conventional circuit-switched a networks, packet-based networks do not generally use this type of routing. In circuit switched networks that use STT routing, the routing decisions generally depend on the transport capacity of the paths between switches. Generally speaking, the virtual paths that link switches in packet-based networks typically possess sufficient capacity so utilizing transport capacity as the criterion for selecting the most recently successful via switch for routing has not proven useful in efforts to apply STT routing in packet networks.

Other techniques for routing calls in circuit-switched networks include Class-of-Service (COS) routing that takes account of the particular class or type of call when making routing decisions. Typically, with COS routing, different classes of calls receive different priorities. Thus, for example, certain classes of calls, such as those associated with "key" service, receive high priority while other classes of class receive lower priority. When selecting a trunk for routing, an originating circuit switch examines both the call priority, as well as the transport capacity needed to carry the call. As with STT routing, COS routing determinations generally depend on the transport capacity, a criterion that is generally not of concern in packet networks. For that reason COS routing is not generally employed in packet-based networks, however in the present invention COS routing techniques are extended to packet-based networks.

BRIEF SUMMARY OF THE INVENTION

Briefly, the present invention provides a method for routing telephone calls in a packet network between an originating switch and a terminating switch using a combination of Success to the Top and Class of Service routing techniques. In accordance with the invention, an originating switch (i.e., a switch receiving a call within the network destined for another switch, hereinafter, a "terminating" switch) first checks for an available direct path to the terminating switch. In other words, the originating switch determines whether a direct path exists to the terminating switch, and whether that direct path possesses an available bandwidth sufficient to carry the call in accordance with its particular class of service. In determining if available bandwidth exists, the originating switch establishes a measure of the existing traffic on the path to establish its load state. From the load state of the path, the originating switch determines whether the direct path possess the requisite bandwidth to carry a particular call in accordance with its class of service. If so, the originating switch routes the call on the direct path to the terminating switch.

Otherwise, if a direct path is not available, then the originating switch searches for a path through a via switch by searching for the via switch that most recently successfully carried a call from the originating switch. Having identified the most recently successful switch, the originating switch determines whether its path to that via switch has an available bandwidth to carry the call in accordance with the class of service of that call. If the path to the most recently successful via switch has sufficient bandwidth to carry the call, then that via switch determines whether its path to the terminating switch has the available bandwidth to carry the call in accordance with the class of service of that call. If so, then that via switch passes the call from the originating switch to the terminating switch.

In the event of a lack of an available path linking the most-recently successful via switch and the terminating switch, the via switch sends a message, which may be a release or crankback message, to the originating switch. Upon receipt of the message, or upon determining the lack of an available path from the originating switch to the most recently successful via switch, the originating switch hunts for a next successful via switch. The originating switch determines whether a path exists to a next candidate via switch and has sufficient available bandwidth. If so, then that via switch determines whether it has a path to the terminating switch with available bandwidth. Should the next most recently successful via switch lack the ability to route the call to the terminating switch, the originating switch will continue searching for a successful via switch through which to route the call until the list of possible via switches is exhausted.

DETAILED DESCRIPTION

Figure 1:
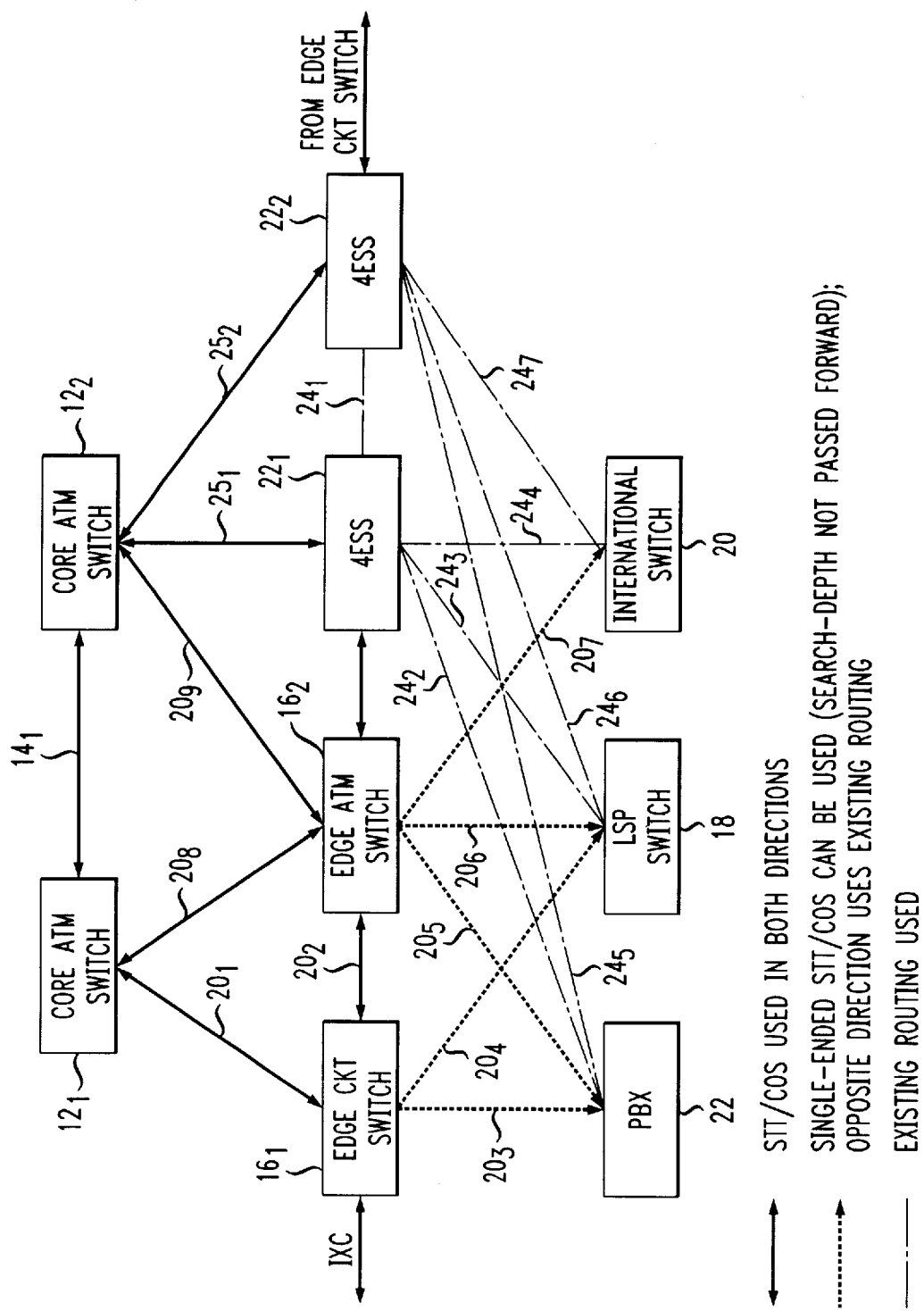
FIG. 1 illustrates a block schematic diagram of a packet-based telecommunications network.

FIG. 1 illustrates a packet-based network 10 for carrying telephone calls. At its core, the network 10 includes one more packet switches, illustratively represented as ATM switches $12_1$–$12_2$, although the network could include a larger number of such switches. The ATM core switches $12_1$ and $12_2$ communicate packetized information (i.e., packets of data representing telephone calls) between themselves across at least one virtual path $14_1$. In practice, each of core ATM switches $12_1$ and $12_2$ comprises an ATM switch available from a variety of vendors, including Lucent Technologies, Ascend Communications, Cisco, and others.

In addition to the core ATM switches $12_1$ and $12_2$, the network 10 includes a plurality of edge switches, depicted as edge switches $16_1$ and $16_2$, each passing traffic between itself and one or more other networks. For example, the edge switches $16_1$ and $16_2$ may send traffic to, as well as receive traffic from any or all of the following: (a) a local service provider, as represented by local switch 18, (b) an international network, represented by international switch 20, (c) a nodal customer, represented by PBX 22, and (d) an Interexchange network (not shown). The edge switches $16_1$ and $16_2$ may take the form of conventional circuit switches, such as the 4ESS or 5 ESS switch available from Lucent Technologies, or alternatively, may comprise ATM switches. In the illustrated embodiment, the edge switch $16_1$ comprises a circuit switch linked to the ATM core switch $12_1$, the edge switch $16_22$, the PBX 22, and the local switch 18 via paths $20_1$, $20_2$, $20_3$, and $20_4$, respectively. Conversely, the edge switch $16_2$ comprises an ATM switch having paths $20_5$, $20_6$, $20_7$, $20_8$, and $20_9$ that link the switch to the PBX 22, the local switch 18, the international switch 20 and the core ATM switches $16_1$ and $16_2$, respectively.

As discussed in greater detail below, traffic on the paths $20_1$, $20_8$, and $20_9$ linking the core switches $12_1$ and $12_2$ to the edge switches $16_1$ and $16_2$ is routed in both directions using a combination of Success to the Top and Class of Service (STT/COS) routing in accordance with the invention. In other words, each of the edge switches $16_1$ and $16_2$ routes a call to another edge switch or a convention circuit switch on an associated one of the paths $20_1$, $20_8$ and $20_9$ via the core switches $12_1$ and $12_2$ using the STT/COS routing of the invention. In contrast to the paths $20_1$, $20_8$, and $20_9$ that are associated with bi-directional STT/COS, traffic on the paths $20_3$–$20_7$, linking the edge switches $16_1$ and $16_2$ to the PBX 22, the local switch 18, and the international switch 20 is routed in one direction only using the STT/COS routing. In other words, the edge switches $16_1$ and $16_2$ route calls to the PBX 22, local service provider switch 18, and the international switch 20 using STT/COS routing in accordance with the invention. However, the PBX 22, local switch 18 and international switch 20 use conventional techniques to route calls to one or more of the edge switches $16_1$ and $16_2$.

In the illustrated embodiment, the network 10 may include other circuit switches, such as switches $22_1$ and $22_2$ which typically comprise 4ESS switches as are known in the art. A communication channel (trunk) $24_1$ interconnects the switches $22_1$ and $22_1$ while trunks $24_2$–$24_4$ and $24_5$–$24_7$ link the switches $22_1$ and $22_2$ to the PBX 22, local service provider switch 18 and the international switch 20, respectively. The switches $22_1$ and $22_1$ also have trunks $25_1$ and $25_2$ that link them to the core switch $12_2$. Unlike the edge switches $16_1$ and $16_2$, the switches $22_1$ and $22_1$ do not necessarily need to utilize the STT/COS routing technique of the invention. Rather, the circuit switches $22_1$ and $22_2$ may utilize conventional routing techniques to route calls to and from the PBX 22 local service provider switch 18 and the international switch 20. In other words, various routing techniques can co-exist and interwork within the same network as a feature of the invention.

Figure 2:
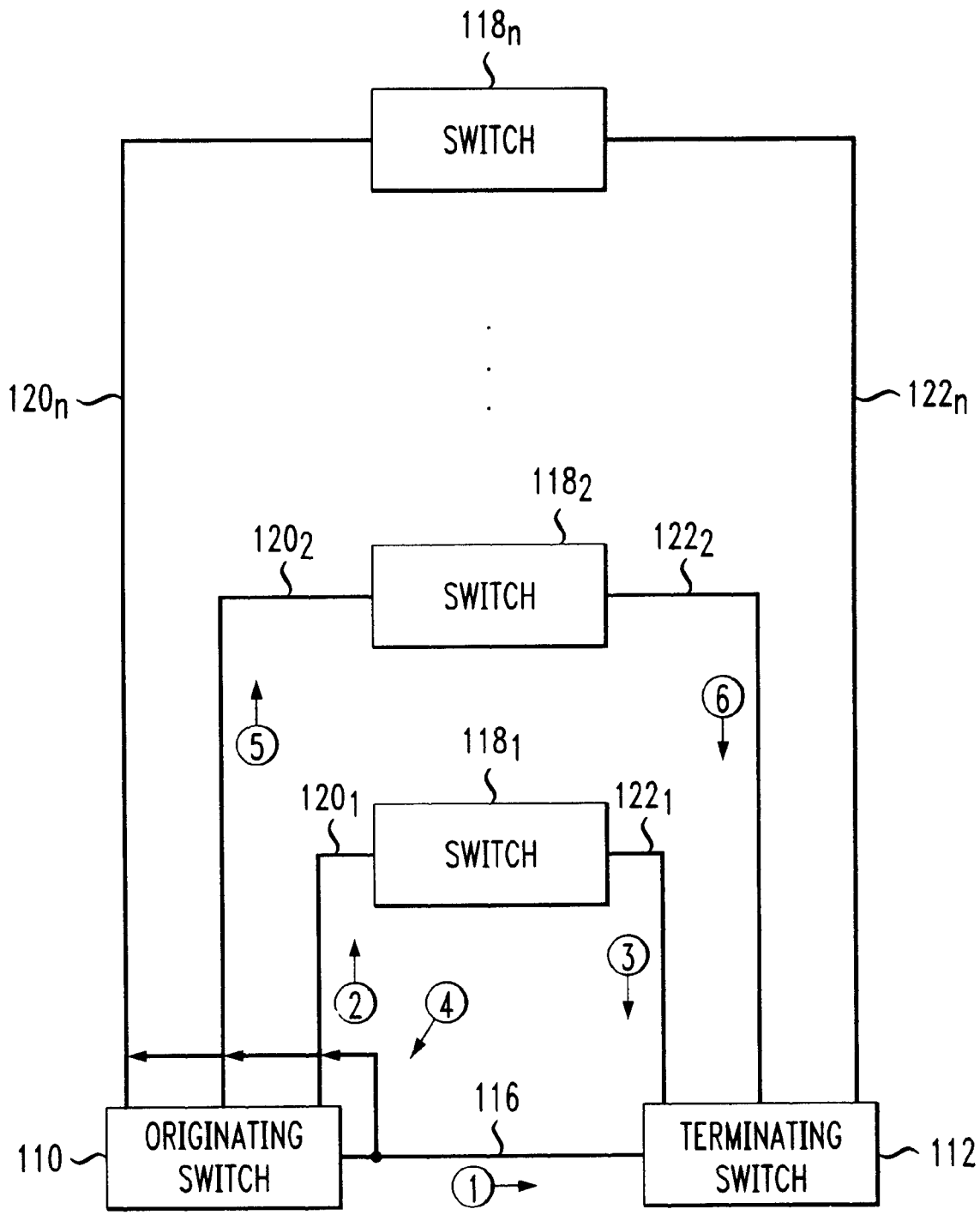
FIG. 2 illustrates a portion of the network of FIG. 1 for the purpose of depicting an exemplary call flow using the Success to the Top/Class of Service routing in accordance with the invention.

FIG. 2 illustrates a simple network 100 to depict an exemplary call flow using the STT/COS routing technique of the invention. The network 100 includes an originating switch 110 and a terminating switch 112 linked by at least one virtual path 116. For purposes of discussion, the originating switch 110 is defined as a switch which receives a call, either from another switch, or even a nodal customer (e.g., PBX 22 of FIG. 1) for routing to the terminating switch. Thus, with respect to the network 10 of FIG. 1, the originating switch may comprise one of ATM one of edge switches $16_1$–$16_2$ whereas the terminating switch may comprise an edge switch, the local switch 18, the international switch 20, or the PBX 22, all of FIG. 1.

In addition to the originating and terminating switches 110 and 112, the network 100 of FIG. 2 includes a plurality of intermediate (via) switches $118_1$–$118_n$ (where n is an integer>0). Each via switch may comprise an edge switch or core switch as depicted in FIG. 1. A corresponding one of virtual paths $120_1$–$120_n$, links each of via switches $118_1$–$118_n$, respectively, to the originating switch 110, while one of virtual paths $122_1$–$122_n$ links a corresponding one of the via switches, respectively, to the terminating switch 112.

The originating switch 110 routes a connection request comprised of a plurality of packets to the terminating switch 112 using the STT/COS routing technique of the invention in the following manner.

First, the originating switch 110 checks for available bandwidth (as discussed below) on the direct path 116. If the path 116 has available bandwidth, the originating switch routes the call to the terminating switch 112 on the direct path 116.

If the direct path 116 is unavailable, the originating switch 110 searches for the most recently successful one of the via switches $118_1$–$118_n$ to determine whether that via switch can successfully route the call to the terminating switch 112. If the most recently successful one of the via switches possesses available bandwidth to route the call, the originating switch 110 selects that via switch.

Otherwise, if the most-recently successful via switch can not route the call, the originating switch 110 searches for a next successful via switch.

If routing on the direct path 116 or through one of the via switches $118_1$–$118_n$ does not succeed, the originating switch will either attempt a further route advance or crankback the call to a previous switch for further alternate routing.

In determining whether to route the call on the direct path 116, the originating switch 110 determines whether the path has available bandwidth in accordance with the class of service of the call in question. In practice, the originating switch originating switch 110 typically receives calls of different types or classes. For example, the originating switch 110 may receive international calls, toll-free calls, Software-Defined Network (SDN) calls, just to name a few. Each different type of call has an associated particular routing priority (e.g., key, normal, or best effort) to meet the grade of service objective for that particular class. The originating switch 110 utilizes the class of service of the call to determine whether a call can be admitted on a particular path, given the Load State of that path.

The originating switch 110 determines whether the allowable load state of each link in a virtual path is lightly loaded (LL), heavily loaded (HL) or reserved (R) by comparing the idle bandwidth (IBW) as described hereinafter, to a blocking rate threshold established by the grade of service requirement for each class of service. Thus, for example, an international call may have a different blocking rate threshold as compared to a domestic long distance call, or an SDN call, based on the differences in class of service. After determining the allowable Load State, the originating switch determines a Depth of Search (DoS) value for the call to determine if the call can pass on a path having a LL, HL, or R Load State (that is, each link in the path has a Load State of the DoS value or better). As discussed below, the DoS depends on several factors, including: bandwidth in progress on a virtual network, call priority, the average virtual network load, the virtual network bandwidth required to meet the grade of service objective and whether the path is direct path or the path is through a via switch.

In order to establish the DoS load state threshold of a path, the originating switch 110 establishes for that path, two separate measures of bandwidth, or two Depth Parameters for each originating-terminating switch pair. These depth parameters are:

BWavg$_{vk}$, the Bandwidth required for each Virtual Network$_v$ (VN$_v$) and node-pair k to carry the average Bandwidth-In-Progress (BWIP$_{vk}$) [=Erlang Load$_{vk}$× Avg BW$_{vk}$/Virtual Path$_{vk}$] and BWmax$_{vk}$, the Bandwidth required to meet the blocking probability Grade-of-Service objective=[TREBS (Erlang Load$_{vk}$, Grade-of-Service)×Avg BW$_{vk}$/ VC$_{vk}$]

In practice, BWavg$_{vk}$ and BWmax$_{vk}$ are computed at prescribed intervals, typically weekly. Different values of BWavg$_{vk}$ and BWmax$_{vk}$ may be used for different periods of the day (business peak, residence peak).

In determining the link Load State, each switch keeps track of two quantities: Bandwidth Peg Count (BWPC) and a Bandwidth Overflow Count (BWOV). During a given interval, (say three minutes) each switch such as switch 110 tracks for each node-pair between switch 110 and another switch:

BWPC(originating switch/terminating switch linking path)=Sum of all Bandwidth (BW) required for each virtual path setup.

BWOV(originating switch/terminating switch linking path)=Sum of BW required for each blocked virtual path setup.

At the end of the given interval, the Node-to-Node blocking (NN) is computed:

NN(originating switch/terminating switch linking path)= BWOV(originating switch/terminating switch linking path)/BWPC(originating switch/terminating switch linking path).

Four different blocking reservation thresholds (BR1, BR2, BR3, BR4) are used, where 0%≤BR1≤BR2≤BR3≤ BR4≤100%. The reservation level N is 0 if BR1 is not exceeded, N=1 if BR1 is exceeded but not BR2, N=2 if BR2 is exceeded but not BR3, N=3 if BR3 is exceeded but not BR4, and N=4 if BR4 is exceeded. This relationship is depicted in Table I.

TABLE I

Determination of Reservation Level (N)

| N | Condition |
|---|---|
| 0 | NN (originating switch /terminating switch linking path) ≤ BR1 |
| 1 | BR1 ≤ NN (originating switch /terminating switch linking path) ≤ BR2 |
| 2 | BR2 ≤ NN (originating switch /terminating switch linking path) ≤ BR3 |
| 3 | BR3 ≤ NN (originating switch /terminating switch linking path) ≤ BR4 |
| 4 | BR4 ≤ NN (originating switch /terminating switch linking path) |

A link, such as link 116, between an originating switch/terminating switch pair is considered in a reserved (R) state if the Idle Bandwidth (ILBW) less than a Reserved Threshold (Rthr), as defined below. The path between the originating switch/terminating switch pair is considered in the Heavily Loaded (HL) state if the Idle Bandwidth is less than a Heavily Loaded threshold (HLthr) but more than Rthr. Conversely, the path between the originating switch/terminating switch pair is considered Lightly Loaded (LL) if the Idle Bandwidth is greater than HLthr. This relationship is best depicted in Table II (here we have omitted, for simplicity, the subscripts k denoting the node-pair for each variable):

TABLE II

Load State Condition

| Name of State | Condition |
|---|---|
| Busy B | ILBW < EQBW |
| Reserved R | ILBW ≤ Rthr |
| Heavily Loaded HL | Rthr < ILBW ≤ HLthr |
| Lightly Loaded LL | HLthr < ILBW |

The Reservation Threshold Rthr and Heavily Loaded Threshold Hlthr are given by the relationships EQBW=the equivalent amount of bandwidth required for a given connection request Rthr =N×0.05×BWmax$_v$ HLthr(originating switch/terminating switch link)=Rthr (originating switch/terminating switch link)+0.05× BWmax$_v$.

where N is the reservation level based on the Blocking Reservation thresholds (BR1, BR2, BR3, and BR4).

The Depth-of-Search (DoS) associated with a call to determine which load states for each link in a path are permissible for that call depends of the Bandwidth-In-Progress (BWIP), the BWavg$_v$ and BWmax$_v$, the HL, LL and R path thresholds, the priority of the call, and the number of links in the path, as illustrated in Table III (here again we have omitted, for simplicity, the subscripts k denoting the node-pair for each variable):

TABLE III

DoS CRITERION

| Load State Allowed$_v$ | Key Service | Normal Service Direct Path | Normal Service 2-Link Path | Best Effort Service |
|---|---|---|---|---|
| R | if BWIP$_v$ ≤ 2 × BWmax$_v$ | if BWip$_v$ ≤ BWavg$_v$ | Not Allowed | Not Allowed |
| HL | if BWIP$_v$ ≤ 2 × BWmax$_v$ | if BWip$_v$ ≤ BWmax$_v$ | if BWIP$_v$ ≤ BWavg$_v$ | Not Allowed |
| LL | All BWIP$_v$ | All BWIP$_v$ | All BWIP$_v$ | All BWIP$_v$ |

The originating switch determines the allowed DoS for the call according to Table III. The originating switch 110 of FIG. 2 first attempts to route the call on the direct path 116 to the terminating switch 112 in the following manner.

For a key service call:
  If BWIP$_v$ ≤ 2×BWmax$_v$, then the call can be routed on the direct path 116 so long as the required bandwidth for the call is available.
  If BWIP$_v$ > 2×BWmax$_v$, then the call can be routed on the direct path only if the link is in LL state and has the required bandwidth for the call.

For a normal service call:
  If BWIP$_v$ ≤ BWavg$_v$, then the call can be routed on the direct path as long as the required bandwidth for the call is available.
  If BWavg$_v$ > BWIP$_v$ ≤ BWmax$_v$, then the call can be routed on the direct path 116 of FIG. 2 only if the link is in HL or LL state and has the required bandwidth for the call.
  If BWIP$_v$ > BWmax$_v$, then the call can be routed on the direct path 116 only if the link is in LL state and has the required bandwidth for the call.

For a best effort service call, the call can be routed on the direct path 116 only if the link is in LL State and has the required bandwidth for the call.

If the originating switch 110 of FIG. 1 cannot route the call on the direct path 116, then the originating switch will attempt to route the call on a 2-link path through the most recently successful one of via switches 118$_1$–118$_n$ to the terminating switch 112. The originating switch 112 uses the load state information of the first link to determine the first link to select as follows:

For a key service call:
  If BWIP$_v$ ≤ 2×BWmax$_v$, then all Load States are allowed. The originating switch starts by checking the last via successfully used (the STT via), or following a crankback, the next allowed via is determined based on circular hunt.
  If BWIP$_v$ > 2×BWmax$_v$, then the originating switch selects the first via switch where the link is in the LL State. The originating switch starts by checking the last via successfully used (the STT via), or following a crankback, the next allowed via is determined based on circular hunt.

For a normal service call:
  If BWIP$_v$ ≤ BWavg$_v$, then only LL and HL Load States are allowed. The originating switch starts by checking the last via successfully used (the STT via), or following a crankback, the next allowed via is determined based on circular hunt.
  If BWIP$_v$ > BWavg$_v$, then the originating switch selects the first via switch where the link is in the LL state. The originating switch starts by checking the last via successfully used (the STT via), or following a crankback, the next allowed via is determined based on circular hunt.

For a best effort service call,
  The originating switch selects the first via switch where the first link is in the LL state. The originating switch starts by checking the last via successfully used (the STT via), or following a crankback, the next allowed via is determined based on circular hunt.

If the originating switch fails to find a path to a via switch and there are other terminating switches that can also complete the call, then the originating switch uses the above-described STT/COS routing method of the invention to route the call to a subsequent terminating switch. Otherwise, the call is blocked.

When the originating switch 110 routes the call to a via switch, then the originating switch passes the bandwidth requirement and the Depth-of-Search (DoS) information (i.e., the path load state) to the via switch in the initial address message (IAM) or Setup signaling message. The via switch routes the call to the terminating switch if the path therebetween possesses the required bandwidth and load state. Otherwise, the via switch returns call control to the originating switch using a release (crankback) message. Upon receipt of the message, the originating switch accomplishes route advance or routes the call on to other eligible paths.

As discussed previously with respect to FIG. 1, the edge switches 16$_1$ and 16$_2$ route calls among themselves in both directions using the STT/COS routing technique of the invention described above. The edge switches 16$_1$ and 16$_2$ could use a single-ended version of the STT/COS routing technique, with each edge switch acting like the originating switch 110 of FIG. 2 to determine the egress route. However, once a next link is selected, the edge switch would not pass forward the Depth-of-Search (DoS) to a subsequent switch. Such single-ended STT/COS routing provides COS and direct route reservation for the network 10 and the outlying network receiving the call therefrom.

In addition to the Class of Service capability which is part of the Call Admission Control (CAC) procedure at the time of call set-up, each switch routing traffic to a subsequent switch will typically utilize a priority queuing as part of the Quality of Service (QoS) capability during the call. In practice, each sending switch maintains a prescribed queuing discipline such that the cells (packets) receive priority, for example, in the following order.

1. Constant Bit Rate (CBR)-key service
2. Variable Bit Rate (VBR)-key service
3. CBR-normal service
4. VBR-normal service
5. Unassigned Bit Rate-best effort service The foregoing describes a technique for routing connection requests such a required by telephone calls in a packet network that utilizes a combination of Success-to-the Top and Class-of-Service principles.

The above-described embodiments merely illustrate the principles of the invention. Those skilled in the art may make various modifications and changes that will embody the principles of the invention and fall within the spirit and scope thereof.

What is claimed is:

1. A method for routing telephone calls of different classes of service in a packet network between an originating switch and a terminating switch over a direct virtual path between the switches if available, and if not, then routing the call between the originating and terminating switches through one of a plurality of via switches, each coupled by separate first and second virtual paths to said originating and terminating switches, respectively, comprising the steps of:

(a) checking whether a direct virtual path exists between the originating and terminating switches and whether such direct link has an available bandwidth sufficient carry a call in accordance with its class of service; and if so (b) routing the call over the direct virtual path, otherwise, (c) checking whether the first virtual path associated with a first via switch that successfully carried a previous call between the originating and terminating switches has an available bandwidth sufficient to carry a new call in accordance with its class of service; and if so then routing said call from said originating switch to said first successful via switch, and (d) checking whether the second virtual path associated with said first successful via switch has an available bandwidth sufficient to carry a call in accordance with its class of service; and if so, routing the call from said first successful via to the terminating switch.

2. The method according to claim 1 wherein said first successful via switch, when unable to route a call to the terminating switch over the second virtual path associated with the said first successful via switch, sends a message to the originating switch indicating the inability of the first successful via switch to route the call.

3. The method according to claim 2 further including the steps:

(a) searching, among the via switches, for a second successful via switch that had successfully carried a call, (b) checking whether the first virtual path associated with said second switch has an available bandwidth sufficient to carry a new call in accordance with its class of service; and if so then routing said call from said originating switch to said second via switch, and (c) checking whether the second virtual path associated with said second successful via switch has an available bandwidth sufficient carry a call in accordance with its class; otherwise;

(d) sending a message to the originating switch from said second successful switch indicating the inability of the second successful via switch to route the call;

(e) searching among the via switches, for another successful via switch that had successfully carried a call; and (f) repeating steps (b)–(d).

4. The method according to claim 1 wherein the step of checking whether the direct link has an available bandwidth includes the steps of:

(a) measuring actual bandwidth on said path;

(b) determining permissible Node-to-Node blocking in accordance with the actual bandwidth;

(c) establishing reservation thresholds in accordance with the Node-to-Node blocking;

(d) determining a load state of the path in accordance with the bandwidth reservation thresholds; and (e) establishing the availability of the path in accordance with the class of service of the call, the load state of the path, and a required bandwidth for the call class of service.

5. The method according to claim 3 wherein the step of checking whether the first virtual path has available bandwidth comprises the steps of:

(a) measuring actual bandwidth in use on each link in said path;

(b) determining permissible Node-to-Node blocking in accordance with the actual bandwidth;

(c) establishing reservation thresholds in accordance with the Node-to-Node blocking;

(d) determining a load state of each link in the path in accordance with the bandwidth reservation thresholds; and (e) establishing the availability of the path in accordance with the class of service of the call, the load state of each link in the path, and required bandwidth for the call class of service.

6. The method according to claim 4 wherein the required bandwidth for the call class of service is established periodically.

7. The method according to claim 1 wherein the originating switch routes calls unidirectionally to the terminating switch in accordance with steps (a)–(d).

8. The method according to claim 1 wherein the originating and terminating switches route calls bidirectionally between each other in accordance with steps (a)–(d).

9. The method according to claim 1 wherein the originating switch communicates information to said via switch necessary for that switch to establish whether available bandwidth exists for carrying a call.

10. A method for routing telephone calls of different classes of service in a packet network between an originating switch and a terminating switch over a direct virtual path between the switches if available, and if not, then routing the call between the originating and terminating switches through one of a plurality of via switches, each coupled by separate first and second virtual paths to said originating and terminating switches, respectively, comprising the steps of:

(a) checking whether a direct virtual path exists between the originating and terminating switches and whether such direct link has an available bandwidth sufficient to carry a call in accordance with its class of service; and if so (b) routing the call over the direct virtual path, otherwise, (c) checking whether the first virtual path associated with a first via switch that successfully carried a previous call between the originating and terminating switches has an available bandwidth sufficient to carry a new call in accordance with its class of service; and if so then routing said call from said originating switch to said successful via switch, (d) checking whether the second virtual path associated with said first successful via switch has an available bandwidth sufficient to carry a call in accordance with its class of service; and if so, routing the call from said successful via switch to the terminating switch otherwise, (e) searching, among the via switches, for a second successful via switch that had successfully carried a call, (f) checking whether the first virtual path associated with said second via switch has an available bandwidth sufficient carry a new call in accordance with its class of service; and if so then routing said call from said originating switch to said second successful via switch, and (g) checking whether the second virtual path associated with said second successful via switch has an available bandwidth sufficient carry a call in accordance with its class; otherwise;

(h) sending a message to the originating switch from said second successful switch indicating the inability of the successful via switch to route the call;

(i) searching among the via switches, for a next successful via switch that successfully carried a call from the originating switch; and (j) repeating steps (e)–(i) until all potential via switchers are exhausted.

11. The method according to claim 10 wherein the step of checking whether the direct link has an available bandwidth includes the steps of:

(a) measuring actual bandwidth in use on said path;

(b) determining permissible Node-to-Node blocking in accordance with the actual bandwidth;

(c) establishing reservation thresholds in accordance with the Node-to-Node blocking;

(d) determining a load state of the path in accordance with the bandwidth reservation thresholds; and (e) establishing the availability of the path in accordance with the class of service of the call, the load state of the path, and a required bandwidth for the call class of service.

12. The method according to claim 10 wherein the required bandwidth for the call class of service is established periodically.

* * * * *